March 31, 1936.    N. LAWSON    2,035,754
MOTOR DRIVEN FARE BOX
Filed Oct. 11, 1932    2 Sheets-Sheet 2
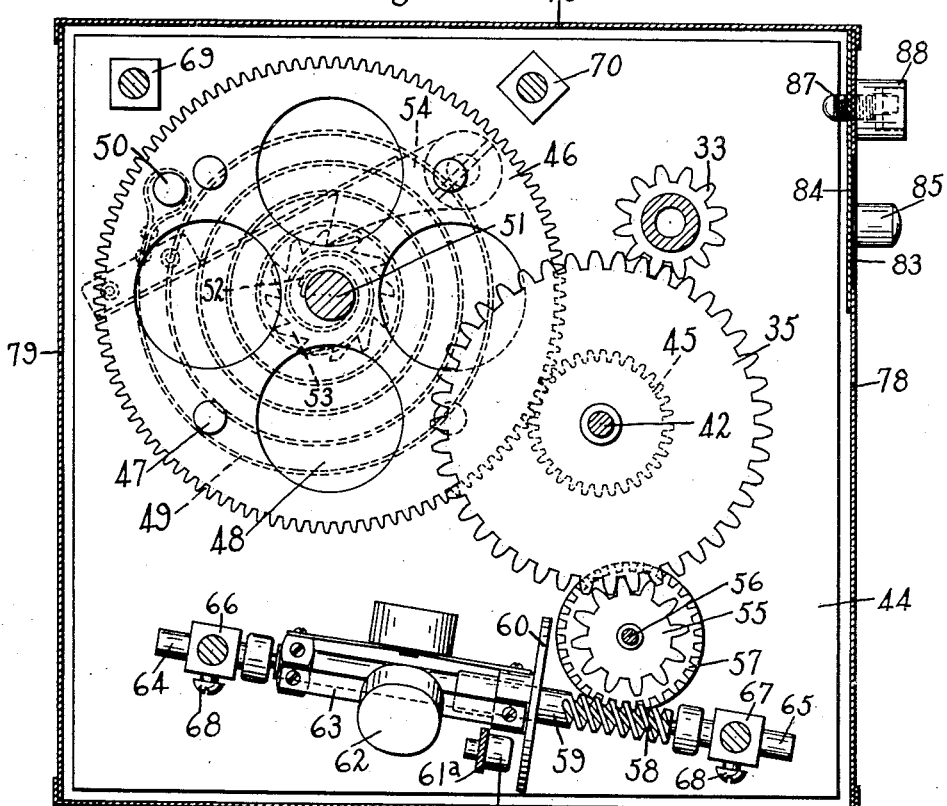
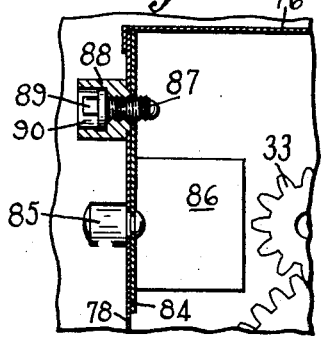
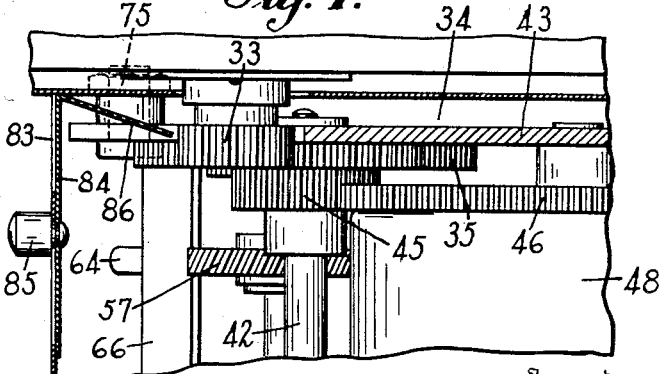
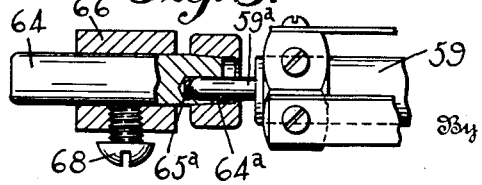

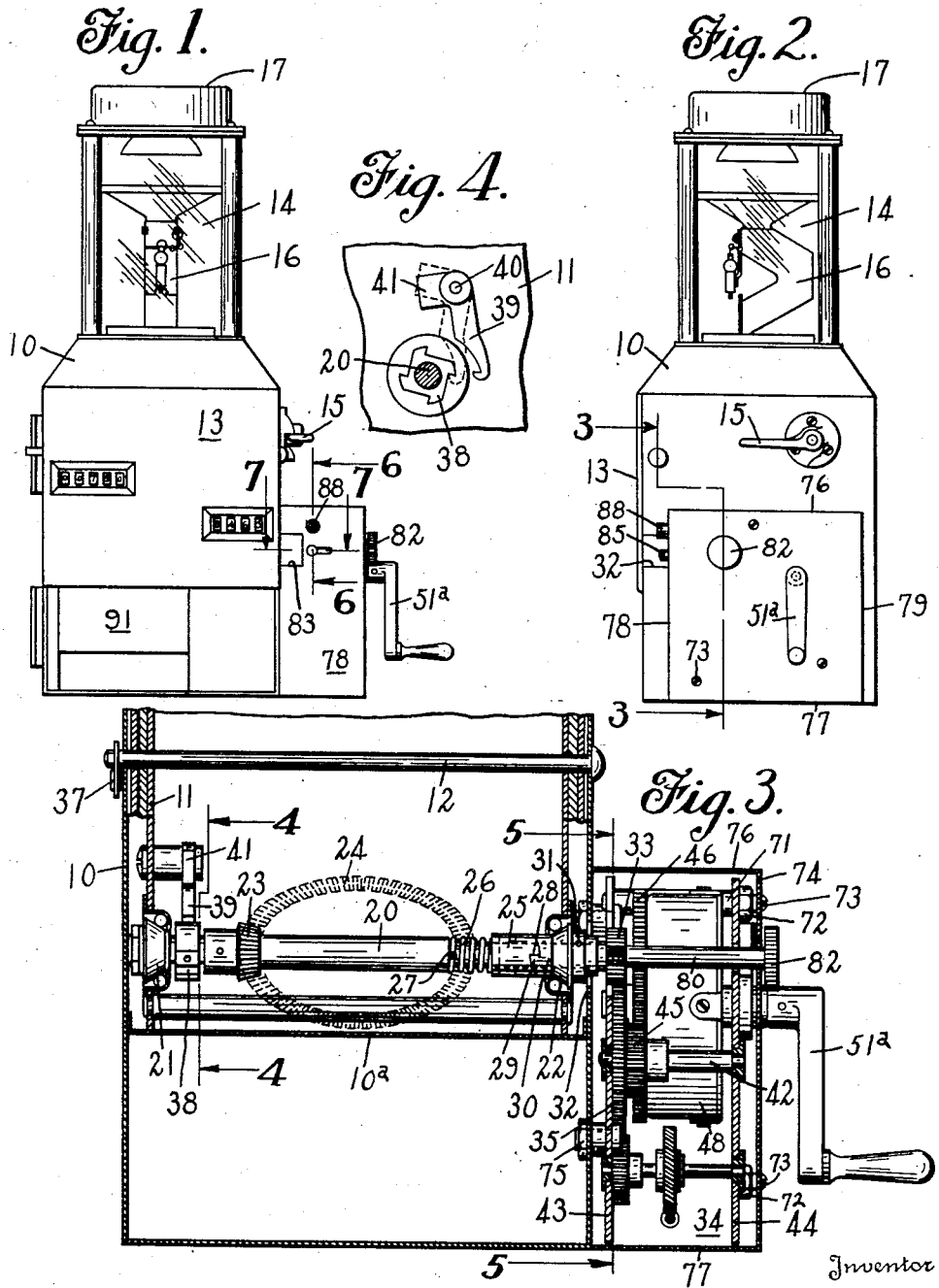

Patented Mar. 31, 1936

2,035,754

UNITED STATES PATENT OFFICE 2,035,754

MOTOR DRIVEN FARE BOX

Neils Lawson, Hamden, Conn.

Application October 11, 1932, Serial No. 637,291

5 Claims. (Cl. 235—32)

This invention relates to fare or coin collecting boxes of the type generally used on passenger vehicles, such as trolley cars, buses, and the like.

More particularly, this invention relates to a motor driven fare box wherein a motor, in this instance a spring motor, is provided as a part of the fare box structure.

One of the objects of this invention is to provide a motor driven fare box of comparatively simple structure and which will be efficient in use.

Another object is to provide a fare box with a spring motor to drive the coin selecting and counting mechanism thereof and thereby relieve the vehicle operator from this duty.

A further object is to provide a generally improved motor driven fare box wherein provision is made for efficiently sealing the same against unlawful tampering with the contents thereof.

A still further object is to provide a spring motor for fare boxes which may readily be incorporated therewith during the manufacture thereof, or may be readily applied to existing fare boxes.

To these and other ends the invention consists in the novel features and combinations of parts to be hereinafter described and claimed.

In the accompanying drawings:

Fig. 1 is a front elevational view of a motor driven fare box embodying the features of this invention;

Fig. 2 is a side elevational view of the same;

Fig. 3 is an enlarged sectional view on line 3—3 of Fig. 2;

Fig. 4 is a detailed section on line 4—4 of Fig. 3;

Fig. 5 is a section on line 5—5 of Fig. 3;

Fig. 6 is a detailed section on line 6—6 of Fig. 1;

Fig. 7 is a detailed section on line 7—7 of Fig. 1;

Fig. 8 is an enlarged side view of the motor governing mechanism shown partly in section for the sake of clearness, and Fig. 9 is a detailed section of parts of the fare box showing the connection therebetween.

The particular fare box shown in the drawings is one that is in general use by some railroad companies and was selected merely for the purpose of illustration. All types of fare boxes are generally similar to this one in that they are arranged to receive coin and coin-like tickets or so-called tokens. Provision is made in these boxes to receive the coins or tokens in such a manner that they may first be inspected by the vehicle operator before they are directed into the selecting and counting mechanism and then ejected therefrom for the use of the operator in making change, or the like. All of these fare boxes are provided with a main driving shaft generally arranged to be operated by the operator by turning a hand crank.

The type of fare box illustrated generally comprises a housing 10 in which the coin selecting and counting mechanism is removably housed by being mounted on a tray or frame 11. The tray 11 is supported upon a shelf 10$^a$, secured to housing 10 and is removable from the housing by sliding the same forwardly from the housing after removing a lock bar 12 that passes through the adjacent sides of both the housing and tray. The tray 11 is provided with a front plate 13 that completely covers the opening in the housing through which the tray is removed. A glass-walled coin receiving receptacle 14 is provided which is disposed above the housing 10, being in communication with the selecting and counting mechanism whereby coins, and the like, may be directed into the latter when swingable plates forming the top of the housing 10 are operated by handle 15. A chute 16 leading from the open mouth 17 of the coin receiving receptacle directs the coins on to the swinging plates and into the range of vision of the operator for inspection thereby.

The coin selecting and counting mechanism of the fare box illustrated is driven by a main shaft 20, which is journaled at each end in bearings 21 and 22, secured to the sides of the removable tray 11. The bevel gear 23 mounted on shaft 20 meshes with a bevel gear 24 which is part of the aforesaid mechanism, to drive the same from shaft 20. A sleeve 25 is mounted on shaft 20 for axial sliding movement thereon and is keyed thereto for rotation therewith. A spring 26 is disposed upon shaft 20 between one end of the sleeve 25 and a shoulder 27 formed on the shaft. Spring 26 acts against sleeve 25 to maintain it axially away from shoulder 27 and to maintain clutch teeth 28 formed on its outer end into clutching engagement with corresponding clutch teeth 29, formed on the end of a bearing sleeve 30 also mounted on shaft 20. Bearing sleeve 30 is freely rotatable on shaft 20, being retained against axial movement in respect thereto by means of a pin 31 that passes transversely therethrough and rides in a circumferential groove formed on shaft 20.

Shaft 20 extends outwardly beyond one side of box 10 through an elongated opening 32, and sleeve 30 is mounted upon this extended portion. A pinion gear 33 is formed or secured to the outer end of sleeve 30 and is disposed within a spring motor housing 34 in mesh with a gear 35. The elongated opening 32 extends from a position back of shaft 20 to the front of the box 10, and permits the removal of the shaft 20 with tray 11 when locking bar 12 is removed. One end of the locking bar 12 is headed and after being disposed in locking position, as shown in Fig. 3, a suitable seal 37 is secured to its other end whereby it cannot be removed without such action being detected.

In fare boxes of this type, a mechanism lock is provided to prevent its operation while it is being moved, for instance from one vehicle to another. In this instance, this lock comprises a toothed wheel 38, secured upon shaft 20, the teeth being so formed as to be caught by the hooked end of a swinging pawl 39, to prevent rotation of the shaft 20 in one direction. The shaft 20 is prevented from continuous rotation in the other direction by automatic release of the spring actuated clutch 28, 29, although a slight rotation is permitted before such release due to frictional engagement therebetween. The pawl 39 is pivoted at 40 for free swinging movement upon the side of the tray 11 and is counter-balanced by an extension 41 so as to remain in inoperative position when the fare box is in its normal vertically disposed position, as shown in Figs. 1 and 2. When the fare box is tilted toward the front, the pawl 39 swings toward the toothed wheel 38 and catches with a tooth thereof whereby rotation of shaft 20 in one direction is prevented. A slight rotation of shaft 20 in the other direction will free pawl 39 from the engaged tooth and such rotation is permitted before clutch teeth 28, 29 are released.

The gear 35 is mounted upon a shaft 42 that is journaled in spaced apart frame members 43 and 44. The pinion 45 secured on shaft 42 is in mesh with the gear 46 which is secured by rivets 47 to a casing 48. A coil spring 49, one end of which is secured to casing 48 at 50 and the other end to a shaft 51 at 52, is disposed within casing 48. The shaft 51 is journaled in frame members 43 and 44 and extends through member 44 and an end wall 74 of housing 34.

A ratchet wheel 53 is secured to shaft 51, and a pawl 54 secured to frame member 44 engages the teeth of ratchet 53 to hold the spring 49 in wound condition and dispose the tension of the wound spring upon the casing 48 through the connection 50, to rotate the casing 48 and with it gear 46. A handle 51a is secured to the outer end of shaft 51 for use in winding the spring 49.

Gear 35 is also meshed with a pinion 55 secured to a shaft 56 that is journaled in frame members 43 and 44. A spiral gear 57 is secured on shaft 56 and is in mesh with a spiral gear 58 formed or secured to a shaft 59. A brake disk 60 is mounted on shaft 59 for axial sliding movement thereon toward and away from a brake button 61, mounted on a bracket 61a secured to and extending from frame member 44. The disk 60 is moved into and out of engagement with the brake button 61 by a centrifugal governor comprising weights 62 mounted on resilient members 63. The resilient members 63 are secured at one end thereof to the disk 60 and at their other end to shaft 59. Rotation of shaft 59 causes the members 63 to bow under the influence of centrifugal force acting on weights 62, whereby disk 60 is moved toward and into engagement with button 61 to control the speed of rotation. This action through the above described gearing controls the rate of unwinding of spring 49 and the speed of rotation of shaft 20.

The ends of shaft 59 are journaled in bearing blocks 64 and 65 respectively, which are adjustably mounted in posts 66 and 67 respectively.

The posts 66 and 67 extend between frame members 43 and 44. The bearing blocks 64 and 65 are retained in posts 66 and 67 by clamp screws 68. Loosening the clamp screws 68 will permit the axial movement of shaft 59 to adjust the disk 60 with respect to button 61 and vary the speed controlling effect of the centrifugal governor. For instance, if disk 60 is moved away from button 61 by such adjustment a greater speed is required to sufficiently bow the member 63 to cause engagement of disk 60 with button 61. The shaft ends 59a are journaled in bearing blocks 64 and 65 by being disposed in an axially directed opening 64a formed in the end of each, the axis of which is eccentric to the axis of the respective bearing block. A disk of hardened metal 65a is placed in each opening 64a and the end 59a of shaft 59 bears against this disk whereby an anti-friction end thrust bearing is provided for the shaft at each end thereof. By loosening clamp screw 68 the bearing blocks may be rotated to adjust shaft 59 transversely toward and away from worm wheel 57 to take up for wear and properly mesh the teeth thereof with those of worm 58.

The frame members 43 and 44 are secured together by posts 66 and 67 and 69 and 70, one end of each of which is riveted to frame 43 and the other end 71 is threaded and extended through frame member 44 and engaged by a nut 72 to clamp the frame members together. The ends 71 of the posts are provided with a threaded opening into which a screw 73, that passes through the end wall 74 of housing 34, is threaded to secure the housing 34 thereto. The frame member 43 is bolted to housing 10 by a plurality of bolts 75.

The housing 34 is provided with the end wall 74, top and bottom side walls 76 and 77 and front and back walls 78 and 79, and when secured to frame member 44 by screws 73 the edges of the side walls closely abut against the side of housing 10 and with it form a complete enclosure for the spring motor mechanism above described and pinion gear 33. A shaft extension 80 is directed through frame 44 and the end wall 74 of housing 34 and has a thumb button 82 secured upon its outer end. The shaft extension 80 is provided with lefthand threads upon one of its ends that are received in a correspondingly threaded opening 81 provided in the outer end of gear 33. By means of the thumb button 82 the shaft extension 80 may be rotated to rotate shaft 20 and release pawl 39 from the toothed wheel 38, or it may be rotated in another direction to remove it from gear 33. Preferably, the shaft extension 80 is tightly screwed to gear 33, so that in order to disconnect the same the latter must be held against rotation, it being understood that rotation of gear 33 in the direction necessary to unscrew extension 80 therefrom would rotate shaft 20 and operate the mechanism in tray 11 and also rotate gear 35 and the associated gearing in housing 34 unless in some manner it is held against rotation.

Provision is made whereby the tray 11 may be withdrawn from housing 10 without removing the motor housing 34, it being understood that the seal 37 is first removed and bar 12 withdrawn, as above described. To permit passage of pinion gear 33 out of the front of housing 34, an opening 83 is provided in the front side wall 78 of housing 34, as shown in Figs. 1 and 7. A sliding cover 84 is provided for opening 83, which may be manipulated by a thumb stud 85. The cover 84 is provided with a rearwardly directed extension 86, the inner end of which lies in the path of forward movement of gear 33 and prevents the same, and with it the tray 11, from withdrawal when the cover is in closed position. The extension 86 is out of the way of gear 33 when the cover 84 is in open position permitting withdrawal of the tray and a lock, comprising a threaded member 87 extending through a boss 88, the cover 84 and the wall 78 when in position retains the cover in closed position. The member 87 is provided with a wrench receiving end 89, in this instance in the form of a triangle in cross-section, and is disposed within a recess 90 formed in the boss 88 whereby a properly formed wrench is required to engage it in order to remove the member 87.

The motor driven fare box above described is generally mounted adjacent the operator of the public vehicle and is under his control and operation. Upon arriving at a destination at which fares are to be collected, the operator winds the spring 49 by turning handle 51ª a few turns. The spring motor mechanism in housing 34 immediately starts whereby shaft 29, which drives the selecting and counting mechanism, is rotated at the desired predetermined speed due to the above described control means. Coins deposited in the box are directed into the counting mechanism wherein they are selected and counted and from which they are discharged into a tray disposed in back of a swinging cover 91 and wherein they are available for use by the operator. The mechanism continues to run until the spring is again unwound and does this without the attention of the operator who is thereby free to give his entire attention to the inspection of the coins deposited, or to the operation of the vehicle. By the use of such a mechanism the number of accidents due to inattention of the operator would be decreased and the receipt of fares would be increased. Before passing through the selecting and counting mechanism, the coins are in loose condition in a portion of tray 11 and should the tray be removed these may be taken therefrom without having been counted. It has been found on some occasions that dishonest operators have removed the seal 37 and rod 12 and upon withdrawing the tray have taken the coins therefrom and then returned the tray and rod, sealing the latter from a supply of seals previously obtained. By the use of the mechanism of this invention the removal of rod 12 would not permit withdrawal of tray 11 without first removing shaft extension 80. Before the shaft extension 80 can be removed, the locking screw 87 must be removed and the cover 84 opened in order to insert a tool to hold pinion gear 33 against rotation. It has been found that the necessity for all these operations and the difficulty experienced in performing them has resulted in a decrease in loss of fares due to dishonest operators.

While I have shown and described a preferred embodiment of my invention, it will be understood that it is not to be limited to all of the details shown, but is capable of modification and variation within the spirit of the invention and the scope of the appended claims.

What I claim is:

1. In a fare box, a casing, rotatable mechanism in said casing, a shaft in said casing drivingly connected to said mechanism, and removable from said fare box, a pinion on an end of said shaft and movable therewith, a spring motor having speed controlled gearing, spaced apart side plates supporting said spring motor parts, means to secure one of said side plates to a side of said casing, and a casing over said spring motor and secured to the other of said side plates, said pinion being disposed within said motor casing in mesh with a gear of said gearing, and removable means extending axially from said pinion through said motor casing, said means being engageable outside of said last mentioned casing to manually rotate said shaft, and, when in position, engaging said last mentioned casing to prevent removal of said shaft and pinion from said fare box.

2. In a fare box, a casing, rotatable mechanism in said casing, a shaft drivingly connected to said mechanism, said shaft extending beyond said casing at one side thereof and having a pinion secured upon the end of the extended portion thereof, said shaft being mounted in said casing for transverse movement relatively to the axis thereof, a spring motor including a gear, a casing about said spring motor, said pinion and gear being disposed within said motor casing and being in mesh whereby one drives the other, a slide member movably mounted on said motor casing, means on said slide member and movable therewith to be disposed adjacent said pinion and in the path of transverse movement of said shaft to prevent the same, and key control means to lock said slide in position whereby the means on said slide member is disposed in shaft movement preventing position.

3. A fare box having a casing, a tray mounted therein and adapted for sliding removal from said casing, a rotatable mechanism within the tray, a shaft drivingly connected to said mechanism and having bearings in the walls of the tray, a pinion on said shaft, a spring-driven motor having a gear in mesh with said pinion to drive said shaft, a casing about said spring motor, and a removable extension on an end of the shaft extending axially therefrom through the motor casing and preventing when in position the removal of said tray from the first-mentioned casing.

4. A fare box having a casing, a tray mounted therein and adapted for sliding removal from said casing, a rotatable mechanism within the tray, a shaft drivingly connected to said mechanism and having bearings in the walls of the tray, a pinion on said shaft movable with said casing, a spring-driven motor having a gear in mesh with said pinion to drive said shaft, a casing about the spring motor, and means slidably mounted on said motor casing and movable into the path of said pinion to prevent movement of said tray out of said first-mentioned casing and of said pinion out of mesh with said gear.

5. A fare box having a casing, a tray mounted therein and adapted for sliding removal from said casing, a rotatable mechanism within the tray, a shaft drivingly connected to said mechanism and having bearings in the walls of the tray, a pinion on said shaft movable with said casing, a spring-driven motor having a gear in mesh with said pinion to drive said shaft, a casing about the spring motor, means slidably mounted on said motor casing and movable into the path of said pinion to prevent movement of said tray out of said first-mentioned casing and of said pinion out of mesh with said gear, and means to lock said slidable means in position to restrain the tray and pinion against movement.

NEILS LAWSON.